Nov. 28, 1950   A. E. MOSER   2,531,580
PHOSPHATE DISTRIBUTING MACHINE
Filed Feb. 10, 1947   2 Sheets-Sheet 1

INVENTOR.
ALBERT E. MOSER
BY *Victor J. Evans & Co.*
ATTORNEYS

Nov. 28, 1950  A. E. MOSER  2,531,580
PHOSPHATE DISTRIBUTING MACHINE
Filed Feb. 10, 1947  2 Sheets-Sheet 2

INVENTOR.
ALBERT E. MOSER
BY Victor J. Evans & Co.
ATTORNEYS

Patented Nov. 28, 1950

2,531,580

UNITED STATES PATENT OFFICE 2,531,580

PHOSPHATE DISTRIBUTING MACHINE

Albert E. Moser, Dayton, Idaho

Application February 10, 1947, Serial No. 727,614

2 Claims. (Cl. 275—2)

This invention relates to phosphate distributing machines and to mechanical dusting equipment.

It is an object of the present invention to provide a phosphate distributing machine which is adapted to be directly connected to the rear of a tractor to extend rearwardly therefrom and which is connected to the power takeoff of the tractor so as to be operated by the same to broadcast phosphate or other pulverized material dropping from a hopper at the top of the equipment rearwardly and laterally over the surface of the ground to be covered with the same.

It is another object of the present invention to provide in a phosphate distributing machine of the direct connected type an open fan or wind blast producing means and a control arrangement for regulating the angle to which the blast of air is extended and the area of spread for the material.

Other objects of the present invention are to provide a phosphate distributing machine or mechanical duster which is of simple construction, inexpensive to manufacture and efficient in operation.

For other objects and for a better understanding of the invention, reference may be had to the following detailed description taken in connection with the accompanying drawing, in which Fig. 1 is a side elevational view of the phosphate distributing machine of the present invention connected to the rear of a tractor.

Figures 1, 2:
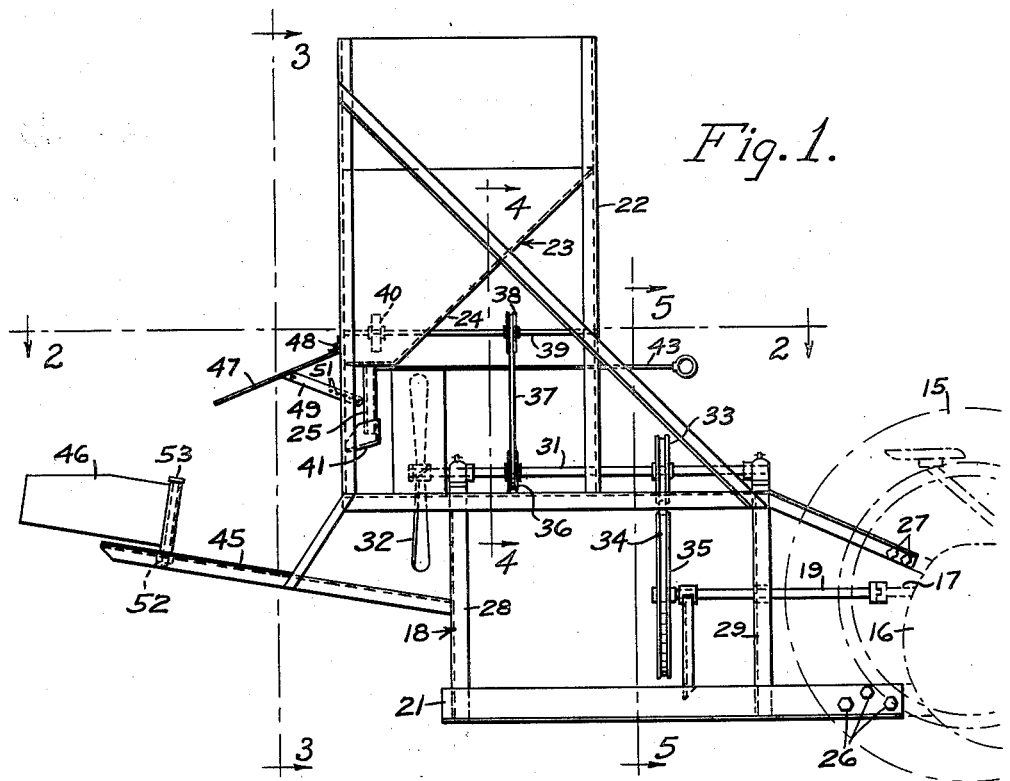
Fig. 2 is a top plan view of the distributing machine shown in Fig. 1 and taken on line 2—2 thereof.
Figure 3:
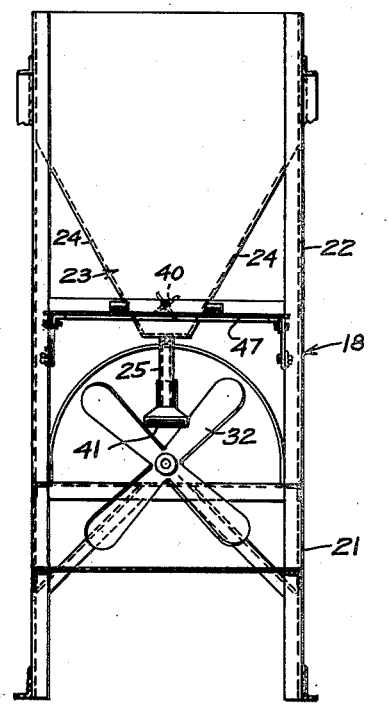
Fig. 3 is a cross-sectional view, in elevation, taken on line 3—3 of Fig. 1 and looking in the direction of the arrows thereof.
Figure 4:
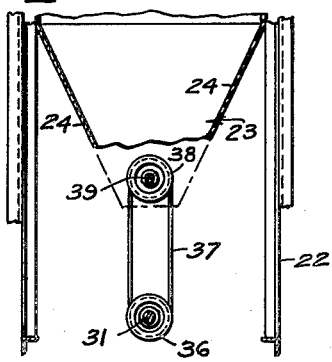
Fig. 4 is a cross-sectional view, in elevation, taken on line 4—4 of Fig. 1 and looking in the direction of the arrows thereof.
Figure 6:
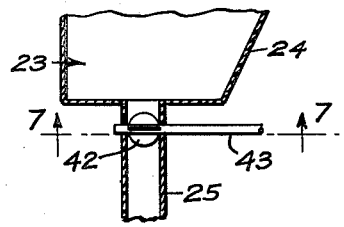
Fig. 6 is a fragmentary cross-sectional view taken through the bottom of the hopper and the delivery tube and looking upon the valve gate disposed therewithin.
Figure 5:
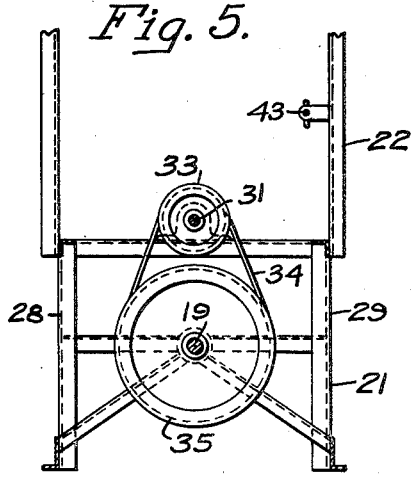
Fig. 5 is a cross-sectional view, in elevation, taken on line 5—5 of Fig. 1 and looking in the direction of the arrows thereof.
Figure 7:
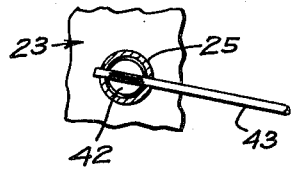
Fig. 7 is a transverse cross-sectional view taken on line 7—7 of Fig. 6 and looking in the direction of the arrows thereof.

Referring now to the figures, 15 represents a tractor having a rear axle structure 16 and a power takeoff shaft 17. To this rear axle structure 16 there may be connected the phosphate distributing machine indicated generally at 18 and in such a manner as to extend rearwardly of the tractor and such that its driving shaft 19 can be connected to the power takeoff shaft 17. This distributing machine 18 has a bottom frame structure 21 and a super structure 22 in which there is disposed a hopper 23 for containing the phosphate to be distributed. This hopper 23 has an inclined and converging bottom 24 over which the phosphate will slide to be dropped through a dispensing tube or chute 25 at the bottom of the hopper. The bottom structure 21 is connected to the rear axle of the tractor by bolts 26 and 27 and is made rigid therewith. The bottom structure 21 has upright members 28 and 29 on the upper ends of which there is journalled a shaft 31 having a fan 32 on its rear end. This shaft 31 has a pulley 33 which is connected by a belt 34 with a pulley 35 which is connected to shaft 19 with the power takeoff shaft 17 of the tractor. This shaft 31 also has a pulley 36 which is connected by a belt 37 with a pulley 38 on an agitating shaft 39 journalled on the super structure 22 and extending into the bottom of the hopper to operate an agitating blade 40 located above the delivery tube 25. At the bottom of the delivery tube 25 is a downwardly and rearwardly inclined surface 41 adapted to receive the phosphate which has dropped through the tube 25. The fan 32 is located in a position so that it throws the air pressure directly in back of the lower end of the phosphate receiving surface 41. The fan is not enclosed and the air delivered by the same is not in any way controlled as by means of a funnel or the like. A valve gate 42 is disposed in the delivery tube 25 and is controlled by a long shaft 43 extending forwardly so that it can be operated by the driver of the tractor. Inasmuch as the parts to be driven by the tractor are connected to the power takeoff thereof these parts can continue in operation even though the tractor may be at a standstill.

Below the portion 41 and the fan blade 32 there is connected to the bottom and upper structures, a lower control platform which extends rearwardly and upwardly as indicated at 45 providing a horizontally disposed baffle. Any phosphate or other material being dispensed which is not already blown into the atmosphere by the fan and which drops upon the platform 45 will be blown eventually rearwardly and laterally from the platform and thus prevent it from dropping directly to the ground. A vane or vertically extending wind control adjustable board or rudder 46 is connected to the platform 45 to help control the wind blast so that more of the wind can be disposed or directed at either one side or the other.

On the super structure 22 and extending rearwardly and downwardly therefrom, is an upper wind control plate or baffle 47. This plate is connected by a hinge 48 with the super structure at its forward end and can be retained in any one of several positions by supporting arms 49 having adjusting holes 51 therein. The wind can be directed downwardly by the downward adjustment of the plate 47.

The adjustable board 46 can be fixed in its adjusted position by tightening a nut 52 or can be left free to pivot on its connecting bolt 53.

While various changes may be made in the detail construction of the invention, it shall be understood that such changes shall be within the spirit and scope of the present invention as defined by the appended claims.

I claim:

1. A phosphate distributing machine or mechanical duster comprising a bottom frame structure adapted to be connected to the rear of a tractor and having driving mechanism thereon adapted to be connected to a power takeoff, a fan connected to the driving mechanism to be driven by the same and positioned to blow air rearwardly from the structure, a frame super structure mounted upon the bottom structure and extending rearwardly over the air path of the fan, a hopper for containing the material to be distributed disposed on the frame super structure and having a delivery tube spaced from the fan and extending downwardly from the lower end of the hopper and positioned above the path of air delivered from the fan whereby the fan blows a blast of air across and below the end of the delivery tube with material from the tube discharging into the air path, a wind control platform extending from the bottom structure rearwardly beneath the fan and rearwardly of the delivery tube from the hopper on to which such of the material which is not dispersed directly by the fan will drop and eventually be blown from the platform by the fan.

2. In a powdered material distributing machine, the combination which comprises a frame, means attaching the frame to a tractor whereby the frame is suspended from the tractor in an elevated position spaced above the ground on which the tractor is positioned, a material hopper having converging sides at the lower end and a chute with a rearwardly directed nozzle depending from the said lower end, said hopper positioned in and carried by the frame, a fan mounted ahead of the said nozzle, spaced from and positioned to blow a stream of air below and across the lower end of the nozzle and rearwardly therefrom whereby material from the nozzle is discharged into the path of the air from the fan and distributed in a fan-like-spray thereby, and inclined substantially horizontal baffle positioned below the nozzle and fan, a vertically positioned rudder adjustably mounted on the horizontal baffle for influencing the air stream from the fan laterally, an upper horizontally disposed inclined baffle extended rearwardly and downwardly from a point on the rear of the frame and positioned above the nozzle, means adjusting the position of the upper baffle, and transmission means carried by the frame whereby the fan is operated from power means of the tractor from which the frame is suspended.

ALBERT E. MOSER.

REFERENCES CITED

The following references are of record in the file of this patent:

UNITED STATES PATENTS

| Number | Name | Date |
|---|---|---|
| 14,630 | Lawrenson | Apr. 8, 1856 |
| 411,692 | Strawson | Sept. 24, 1889 |
| 657,419 | Jager | Sept. 4, 1900 |
| 1,482,495 | Westhaver | Feb. 5, 1924 |
| 2,014,392 | Mackintosh | Sept. 17, 1935 |
| 2,476,465 | Tarrant | July 19, 1949 |

FOREIGN PATENTS

| Number | Country | Date |
|---|---|---|
| 671,378 | France | Sept. 2, 1929 |